(12) United States Patent
Moriya (10) Patent No.: US 8,306,354 B2
(45) Date of Patent: Nov. 6, 2012

(54) IMAGE PROCESSING APPARATUS, METHOD, AND PROGRAM

(75) Inventor: Yoshiyuki Moriya, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 751 days.

(21) Appl. No.: 12/457,427

(22) Filed: Jun. 10, 2009

(65) Prior Publication Data

US 2009/0310883 A1 Dec. 17, 2009

(30) Foreign Application Priority Data

Jun. 12, 2008 (JP) ................................ 2008-153790

(51) Int. Cl.
*G06K 9/40* (2006.01)
*G06T 15/50* (2011.01)
(52) U.S. Cl. ........................................ 382/274; 345/426
(58) Field of Classification Search .......... 382/128–134, 382/173, 274, 305, 312, 299; 345/419, 426; 600/523

See application file for complete search history.

(56) References Cited

U.S. PATENT DOCUMENTS

| | | | | |
|---|---|---|---|---|
| 4,769,850 A | * | 9/1988 | Itoh et al. | 382/132 |
| 7,298,878 B2 | * | 11/2007 | Goto | 382/128 |
| 7,403,645 B2 | * | 7/2008 | Kasai | 382/128 |
| 7,830,543 B2 | * | 11/2010 | Maki | 358/1.18 |
| 7,916,923 B2 | * | 3/2011 | Shinbata | 382/133 |
| 2007/0016016 A1 | | 1/2007 | Haras et al. | |
| 2008/0044080 A1 | | 2/2008 | Li | |

FOREIGN PATENT DOCUMENTS

| | | |
|---|---|---|
| JP | 2006-334404 A | 12/2006 |
| JP | 2007-275216 A | 10/2007 |
| JP | 2007-307358 A | 11/2007 |
| JP | 2008-006188 | 1/2008 |

OTHER PUBLICATIONS

Y. Wakida et al.; Liver Cancer Detection based on a Temporal Density Feature from Abdominal Dynamic X-ray CT Images; Journal of Computer Aided Diagnosis of Medical Images; pp. 1-10; vol. 10 No. 1; Japan; Mar. 2007.
J. Masumoto et al., Automated Detection of Liver Tumors in X-Ray CT Images, The transactions of the Institute of Electronics, Information and Communication Engineers D-II; pp. 219-227; vol. J83D-II, No. 1; Japan; 2000.
Yuri Y. Boykov et al; Interactive Graph Cuts for Optimal Boundary & Region Segmentation of Objects in N-D Images; Proceedings of "Internation Conference on Computer Vision"; pp. 105-112; vol. I; Vancouver, Canada; Jul. 2001.

* cited by examiner

*Primary Examiner* — Kanjibhai Patel
(74) *Attorney, Agent, or Firm* — Jean C. Edwards, Esq.; Edwards Neils PLLC (57) ABSTRACT

A shadow region extraction method capable of extracting a shadow region from contrast enhanced three-dimensional images obtained at different time points in an improved manner. The method includes the steps of detecting a first shadow region from a contrast enhanced two-dimensional image constituting a contrast enhanced three-dimensional image obtained at a first time point among a plurality of contrast enhanced three-dimensional images of a subject obtained at different time points, detecting, by the use of position information of a point in the first shadow region, a second shadow region corresponding to the first shadow region from a contrast enhanced two-dimensional image constituting a contrast enhanced three-dimensional image obtained at a second time point different from the first time point, and displaying the first shadow region and the second shadow region.

10 Claims, 6 Drawing Sheets

DISPLAY MARK AT CENTER OF LESION POSITION

FIG.10A

DISPLAY LESION CONTOUR

FIG.10B

DISPLAY ARROW POINTING TO CENTER OUTSIDE OF LESION CONTOUR

FIG.10C

IMAGE PROCESSING APPARATUS, METHOD, AND PROGRAM

CROSS-REFERENCE TO RELATED APPLICATIONS

The present application claims priority from Japanese Patent Application No. 2008-153790, filed Jun. 12, 2008, the contents of which are herein incorporated by reference in their entirety.

BACKGROUND OF THE INVENTION

1. Field of the Invention

The present invention relates to an image processing apparatus, method, and program for extracting a shadow region in an image, and more particularly to an image processing apparatus, method, and program for extracting a shadow region from each of a plurality of contrast enhanced three-dimensional images obtained at different time points.

2. Description of the Related Art

In the medical field, it has been practiced to extract and display a shadow region representing a tumor region or the like in a contrast enhanced three-dimensional image in order to reduce the burden of radiological reading on doctors or the like.

For example, a photography method called dynamic CT that combines contrast agent angiography with X-ray CT is used, in which a plurality of contrast enhanced three-dimensional images is obtained by injecting a contrast agent into a subject and serially photographing the subject.

In the dynamic CT, the photographing is performed serially within a few minutes from the time when a contrast agent is injected into a subject to the time when the agent permeates over the entire liver after flowing through artery and portal vein. Here, it is necessary to perform comparative reading of a plurality of contrast enhanced three-dimensional images for temporal changes. Accordingly, the amount of reading required for one patient is increased to several times of that of ordinary photographing.

Further, the amount of data obtained at a time has increased dramatically with the advancement in accuracy of CT systems, so that the burden of radiological reading has become a serious problem. Under such circumstances, it is urgently required to improve the environment that allows a doctor or the like to perform an accurate diagnosis of a liver in a short time without overlooking a tumor region in the liver, and there is a growing demand for the development of computer aided diagnosis system.

A literature "Liver Cancer Detection based on a Temporal Density Feature from Abdominal Dynamic X-ray CT Images" by Y. Wakida et al., Journal of Computer Aided Diagnosis of Medical Images, Vol. 10, No. 1, pp. 1-10, 2007 proposes a method for detecting a tumor region of a liver with respect to each of contrast enhanced three-dimensional images obtained at different time points.

The contrast patterns of contrast enhanced three-dimensional images obtained at different time points, however, show different features at different phases, such as early phase, portal phase, late phase, equilibrium phase, and the like. Generally, it is known that a tumor region of a liver shows a characteristic contrast pattern that it is dyed densely (high CT value) in the early phase, comparably in portal phase, and thinly (low CT value) in the late phase.

Therefore, it is difficult for the method proposed in the literature described above to detect a tumor region of a liver from a contrast enhanced three-dimensional image taken at a predetermined time point and cannot satisfy the accuracy level demanded by a doctor. Further, it requires a huge amount of time for non-rigid registration.

In view of the circumstances described above, it is an object of the present invention to provide an image processing apparatus and method capable of extracting a shadow region from contrast enhanced two-dimensional images constituting contrast enhanced three-dimensional images obtained at different time points in an improved manner. It is a further object of the present invention to provide a computer readable recording medium on which is recorded a program for causing a computer to function as the image processing apparatus.

SUMMARY OF THE INVENTION

A first image processing apparatus of the present invention is an apparatus, including:

a first shadow region detection unit for detecting a first shadow region from a contrast enhanced two-dimensional image constituting a contrast enhanced three-dimensional image obtained at a first time point among a plurality of contrast enhanced three-dimensional images of a subject obtained at different time points;

a second shadow region detection unit for detecting, by the use of position information of a point in the first shadow region detected by the first shadow region detection unit, a second shadow region corresponding to the first shadow region from a contrast enhanced two-dimensional image constituting a contrast enhanced three-dimensional image obtained at a second time point different from the first time point; and a display unit for displaying the first shadow region detected by the first shadow region detection unit and the second shadow region detected by the second shadow region detection unit.

Specific examples of the "subject" include a human body and other animals.

The term "contrast enhanced three-dimensional image" as used herein refers to a three-dimensional image constituted by a plurality of contrast enhanced two-dimensional images.

For "contrast enhanced two-dimensional images", those representing cross-sections substantially orthogonal to the body axis of a subject are used if taken by a CT system, a MRI system, or a PET system. In particular, the images may be those taken by a CT system after injecting a contrast agent into the subject.

The first image processing apparatus of the present invention may further include a database storing data that indicate a contrast enhanced three-dimensional image to be inputted to the first shadow detection unit obtained at a time point when contrast enhancement effect is maximally reflected according to tumor type, an input receiving unit for receiving input of a tumor type, and an image determination unit for determining the contrast enhanced three-dimensional image obtained at the first time point based on the data stored in the database and the tumor type received by the input receiving unit.

In the first image processing apparatus, the second shadow region detection unit may include a setting unit for setting, base on the position information of the point in the first shadow region, a corresponding point corresponding to the point in the contrast enhanced two-dimensional image constituting the contrast enhanced three-dimensional image obtained at the second time point, a range determination unit for determining an existence range, in which the second shadow region may possibly exist, in the contrast enhanced two-dimensional image constituting the contrast enhanced three-dimensional image obtained at the second time point using the corresponding point and a possible size of the second shadow region, and a shadow region extraction unit for extracting the second shadow region by a graph cut region segmentation method from the contrast enhanced two-dimensional image constituting the contrast enhanced three-dimensional image obtained at the second time point based on the corresponding point set by the setting unit and a point outside of the existence range determined by the range determination unit.

The first image processing apparatus may further include a specific area detection unit for detecting a specific area, which includes the first shadow region, from the contrast enhanced two-dimensional image constituting the contrast enhanced three-dimensional image obtained at the first time point, a corresponding area detection unit for detecting a corresponding area, having substantially the same shape as that of the specific area detected by the specific area detection unit, from the contrast enhanced two-dimensional image constituting the contrast enhanced three-dimensional image obtained at the second time point, and the second shadow region detection unit may be a unit for detecting the second shadow region from the contrast enhanced two-dimensional image, which includes the corresponding area detected by the corresponding point detection unit, constituting the contrast enhanced three-dimensional image obtained at the second time point.

The term "specific area" as used herein refers to an area representing a body region of a subject. For example, it may be an area representing a body region of a subject, such as liver, kidney, or the like, or a body surface of the subject.

A first image processing method of the present invention is a method, including the steps of:

detecting a first shadow region from a contrast enhanced two-dimensional image constituting a contrast enhanced three-dimensional image obtained at a first time point among a plurality of contrast enhanced three-dimensional images of a subject obtained at different time points;

detecting, by the use of position information of a point in the first shadow region, a second shadow region corresponding to the first shadow region from a contrast enhanced two-dimensional image constituting a contrast enhanced three-dimensional image obtained at a second time point different from the first time point; and displaying the first shadow region and the second shadow region.

A first computer readable recording medium of the present invention is a medium on which is recorded a program for causing a computer to perform:

a first shadow region detection function for detecting a first shadow region from a contrast enhanced two-dimensional image constituting a contrast enhanced three-dimensional image obtained at a first time point among a plurality of contrast enhanced three-dimensional images of a subject obtained at different time points;

a second shadow region detection function for detecting, by the use of position information of a point in the first shadow region detected by the first shadow region detection function, a second shadow region corresponding to the first shadow region from a contrast enhanced two-dimensional image constituting a contrast enhanced three-dimensional image obtained at a second time point different from the first time point; and a display function for displaying the first shadow region detected by the first shadow region detection function and the second shadow region detected by the second shadow region detection function.

A second image processing apparatus of the present invention is an apparatus, including:

an input receiving unit for receiving input of a point in a shadow region of a contrast enhanced two-dimensional image constituting a contrast enhanced three-dimensional image obtained at a first time point among a plurality of contrast enhanced three-dimensional images of a subject obtained at different time points;

a second shadow region detection unit for detecting, by the use of position information of the point in the first shadow region received by the input receiving unit, a second shadow region corresponding to the first shadow region from a contrast enhanced two-dimensional image constituting a three-dimensional image obtained at a second time point different from the first time point; and a display unit for displaying the first shadow region and the second shadow region detected by the second shadow region detection unit.

A second image processing method of the present invention is a method, including the steps of:

receiving input of a point in a shadow region of a contrast enhanced two-dimensional image constituting a contrast enhanced three-dimensional image obtained at a first time point among a plurality of contrast enhanced three-dimensional images of a subject obtained at different time points;

detecting, by the use of position information of the point in the first shadow region, a second shadow region corresponding to the first shadow region from a contrast enhanced two-dimensional image constituting a three-dimensional image obtained at a second time point different from the first time point; and displaying the first shadow region and the second shadow region.

A second computer readable recording medium of the present invention is a medium on which is recorded a program for causing a computer to perform:

an input receiving function for receiving input of a point in a shadow region of a contrast enhanced two-dimensional image constituting a contrast enhanced three-dimensional image obtained at a first time point among a plurality of contrast enhanced three-dimensional images of a subject obtained at different time points;

a second shadow region detection function for detecting, by the use of position information of the point in the first shadow region received by the input receiving function, a second shadow region corresponding to the first shadow region from a contrast enhanced two-dimensional image constituting a three-dimensional image obtained at a second time point different from the first time point; and a display function for displaying the first shadow region and the second shadow region detected by the second shadow region detection function.

According to the image processing apparatus, program, and computer readable recording medium of the present invention, a second shadow region detection unit is provided for detecting, by the use of position information of a point in a detected first shadow region, a second shadow region corresponding to the first shadow region from a contrast enhanced two-dimensional image constituting a contrast enhanced three-dimensional image obtained at a second time point using position information of the point in the first shadow region, and the detected first shadow region and the detected second shadow region are displayed. This may reduce the burden of complicated manual input operation, and a shadow region may be accurately detected from each of contrast enhanced three-dimensional images obtained at different time points.

Further, according to the image processing apparatus, program, and computer readable recording medium of the present invention, by further providing a database storing data that indicates a contrast enhanced three-dimensional image to be inputted to the first shadow region detection unit obtained at a time point when contrast enhancement effect is maximally reflected according to tumor type, an input receiving unit for receiving input of a tumor type, and an image determination unit for determining the contrast enhanced three-dimensional image obtained at the first time point based on the data stored in the database and the tumor type received by the input receiving unit, a shadow region may be detected more accurately from a contrast enhanced three-dimensional image obtained at a time when contrast enhancement effect is not reflected so strongly.

Still further, according to the image processing apparatus, program, and computer readable recording medium of the present invention, a second shadow region detection unit for detecting, by the use of position information of a received predetermined point, a second shadow region corresponding to a first shadow region from a contrast enhanced two-dimensional image constituting a three-dimensional image obtained at a second time point and a display unit for displaying the first shadow region and the second shadow region detected by the second shadow region detection unit are provided. Therefore, a shadow region may be accurately detected from each of contrast enhanced three-dimensional images obtained at different time points.

DESCRIPTION OF THE PREFERRED EMBODIMENTS

Figure 1:
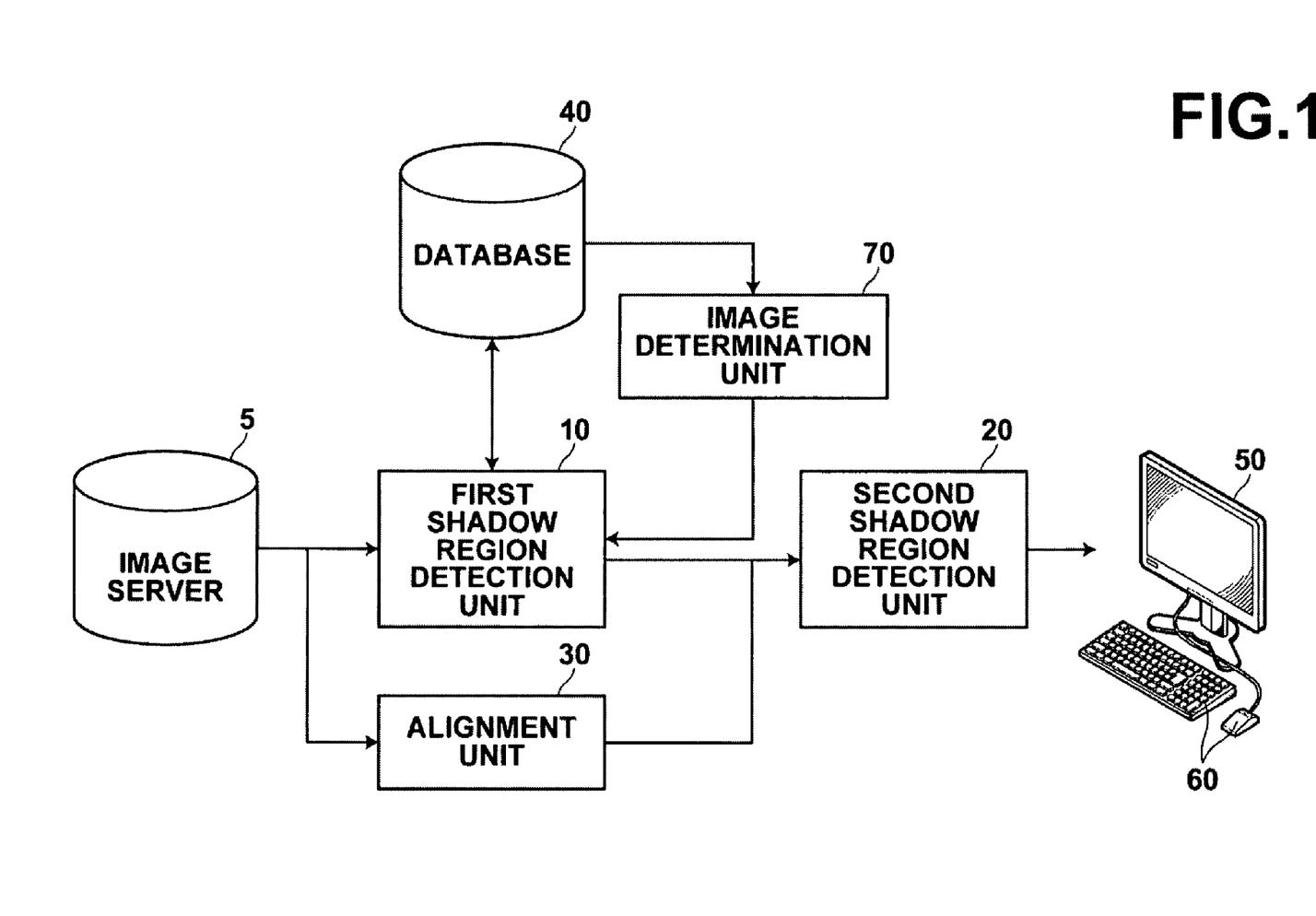
FIG. 1 is a block diagram of an embodiment of an image processing apparatus of the present invention.

Hereinafter, exemplary embodiments of an image processing apparatus of the present invention appropriate for extracting a shadow region from a contrast enhanced three-dimensional image will be described with reference to the accompanying drawings. The configuration of the image processing apparatus shown in FIG. 1 is realized by executing a target region extraction program, read in an auxiliary storage device, on a computer (e.g., personal computer, or the like). Here, the image processing program is stored in information recording medium, such as CD-ROM or the like, or distributed through a network, such as the Internet, and installed on the computer.

The image processing apparatus shown in FIG. 1 includes first shadow region detection unit 10 for detecting a first shadow region from a contrast enhanced two-dimensional image constituting a contrast enhanced three-dimensional image obtained at a first time point among a plurality of three-dimensional images of a subject obtained at different time points and stored in image server 5, second shadow region detection unit 20 for detecting a second shadow region corresponding to the detected first shadow region from a contrast enhanced two-dimensional image constituting a contrast enhanced three dimensional image obtained at a second time point different from the first time point using position information of a predetermined point in the first shadow region, display unit 50 for displaying the first shadow region detected by the first shadow region detection unit 10 and the second shadow region detected by the second shadow region detection unit 20, database 40 storing data that indicates a contrast enhanced three-dimensional image to be inputted to the first shadow region detection unit obtained at a time point when contrast enhancement effect is maximally reflected according to tumor type, input receiving unit 60 for receiving input of tumor type, image determination unit 70 for determining the contrast enhanced three-dimensional image obtained at the first time point based on the data stored in database 40 and the type of tumor received by input receiving unit 60, and alignment unit 30 for aligning the position of each of the plurality of contrast enhanced three-dimensional images of the subject in the height direction.

The image processing apparatus uses contrast enhanced three-dimensional images obtained by serially photographing the subject a plurality of times within a few minutes from the time when a contrast agent is injected to the time when the agent permeates over the entire liver or the like after flowing through artery and portal vein (e.g., three-dimensional images taken at early phase, portal phase, late phase, and the like).

First shadow region detection unit 10 detects a first shadow region from a contrast enhanced two-dimensional image constituting a contrast enhanced three-dimensional image obtained at a first time point (e.g., late phase) among a plurality of contrast enhanced three-dimensional images of a subject obtained at different time points.

For example, first shadow region detection unit 10 detects the first shadow region from the two-dimensional image constituting the three-dimensional image obtained at the first time point among the plurality of contrast enhanced three-dimensional images using the shadow region detection method described in a literature "Automated Detection of Liver Tumors in X-Ray CT Images" by J. Masumoto et al., The transactions of the Institute of Electronics, Information and Communication Engineers D-II, Vol. J83D-II, No. 1, pp. 219-227, 2000.

In the first shadow region detection method, a liver region is manually extracted from a two-dimensional image using input receiving unit 60. Then, the image is smoothed and digitized by setting threshold values. Then, connected component processing is performed on each candidate in the digitized image to obtain a rating score representing the probability of a lesion being present for each candidate. Then, an evaluation value of a shadow region (lesion area) being present is calculated with respect to the image and a candidate having a high evaluation value is detected as the first shadow region.

Second shadow region detection unit 20 detects a second shadow region corresponding to the first shadow region detected by first shadow region detection unit 10 from a contrast enhanced two-dimensional image constituting a contrast enhanced three dimensional image obtained at a second time point using position information of a predetermined point in the first shadow region.

Further, second shadow region detection unit 20 detects a second shadow region corresponding to the first shadow region detected by first shadow region detection unit 10 from a contrast enhanced two-dimensional image constituting a contrast enhanced three dimensional image obtained at a second time point using position information of a predetermined point in the first shadow region based on alignment result of alignment unit 30 to be described later.

For example, second shadow region detection unit 20 automatically calculates the center or gravity point of the first shadow region detected by first shadow region detection unit 10 and sets the point as the predetermined point.

The second shadow region detection method will be described in detail later.

Alignment unit 30 includes a specific area detection unit (not shown) for detecting a specific area, including the first shadow region, from the contrast enhanced two-dimensional image constituting the contrast enhanced three-dimensional image obtained at the first time point and a corresponding area detection unit (not shown) for detecting a corresponding area, having a substantially the same shape as that of the detected specific area, from the contrast enhanced two-dimensional image constituting the contrast enhanced three-dimensional image obtained at the second time point. It aligns the positions between the contrast enhanced two-dimensional image constituting the contrast enhanced three dimensional image obtained at the first time point and the contrast enhanced two-dimensional image constituting the contrast enhanced three dimensional image obtained at the second time point. When a target subject is serially photographed at different time points by a CT system or the like, the position of the subject or photographed range may sometimes differ every time the photographing is performed. Even such is the case, alignment unit 30 relates a contrast enhanced two-dimensional image constituting a contrast enhanced three-dimensional image obtained at a first time point with a contrast enhanced two-dimensional image constituting a three-dimensional image obtained at a second time point different from the first time point in which the positions of the subject in the height direction of the body axis are aligned.

The image processing apparatus of the present invention may further include a specific area detection unit (not shown) for detecting a specific area including the first shadow region from the contrast enhanced two-dimensional image constituting the contrast enhanced three-dimensional image obtained at the first time point and a corresponding area detection unit (not shown) for detecting a corresponding area having a substantially the same shape as that of the detected specific area from the contrast enhanced two-dimensional image constituting the contrast enhanced three-dimensional image obtained at the second time point, and second shadow region detection unit 20 may be a unit that detects the second shadow region from the contrast enhanced two-dimensional image, including the corresponding area detected by the corresponding area detection unit, constituting the contrast enhanced three-dimensional image.

More specifically, alignment unit 30 includes the specific area detection unit and corresponding area detection unit.

The specific area detection unit detects a specific area that includes the first shadow region from the contrast enhanced two-dimensional image constituting the contrast enhanced three-dimensional image obtained at the first time point.

For example, the specific area detection unit detects a body surface area from a certain contrast enhanced two-dimensional image constituting a contrast enhanced three-dimensional image obtained at late phase.

The corresponding area detection unit detects a corresponding area, having substantially the same shape as that of the specific region detected at the first time point, from the contrast enhanced two-dimensional image constituting the contrast enhanced three-dimensional image obtained at the second time point, whereby the certain contrast enhanced two-dimensional image constituting the contrast enhanced three-dimensional image obtained at late phase may be aligned with the contrast enhanced two-dimensional image corresponding to the certain contrast enhanced two-dimensional image constituting the contrast enhanced three-dimensional image obtained at equilibrium phase.

The corresponding area detection unit may be a unit that performs predetermined deformation on the body surface area (specific area) detected by the specific area detection unit and detect a corresponding area having substantially the same shape as that of the deformed body surface area (specific area) from the contrast enhanced two-dimensional image constituting the contrast enhanced three-dimensional image in equilibrium phase, whereby the certain contrast enhanced two-dimensional image constituting the contrast enhanced three-dimensional image obtained at late phase may be aligned with the contrast enhanced two-dimensional image corresponding to the specific contrast enhanced two-dimensional image constituting the contrast enhanced three-dimensional image obtained at equilibrium phase. The reason for performing the deformation is that when a target subject is serially photographed at different time points by a CT system or the like, the position of the subject or photographed range may sometimes differ every time the photographing is performed and each image taken at a different time point may be deformed.

The deformation includes, for example, translation, rotation, and the like. The translation may be a process that aligns contrast enhanced two-dimensional images or contrast enhanced three-dimensional images by aligning the center points of detected body surface areas.

The rotation may be a process that obtains long and short axes of each of the detected body surface areas and performs the alignment such that the respective axes are aligned between each of the body surface areas.

The method described in Japanese Patent Application No. 2007-104846 may be used for detecting the body surface area.

The specific area or corresponding area is not limited to the body surface area, and may be a certain region of the subject.

Alignment unit may be a unit that performs alignment using the method described in Japanese Unexamined Patent Publication No. 2008-006188.

Database 40 includes data that indicates a contrast enhanced three-dimensional image obtained at a time point when contrast enhancement effect is maximally reflected which is dependent on tumor type.

Display unit 50 is a unit for displaying an image, which may be, for example, a display.

Input receiving unit 60 is a unit for receiving input from an operator, which may be, for example, a mouse or a keyboard.

A process for displaying first and second shadow regions according to an embodiment of the present invention will now be described with reference to the flowchart in FIG. 2.

A contrast enhanced three-dimensional image obtained at a first time point (e.g., late phase) is obtained from image server 5 (step ST1).

Then, first shadow region detection unit 10 detects a first shadow region from a contrast enhanced two-dimensional image constituting the contrast enhanced three-dimensional image obtained at the first time point (e.g., late phase) (step ST2).

Alignment unit 30 aligns the contrast enhanced three-dimensional image obtained at the first time point with a contrast enhanced three-dimensional image obtained at a second time point (step ST3). Second shadow region detection unit 20 sets position information of a predetermined point in the first shadow region detected by first shadow region detection unit 10 (step ST4). The predetermined point may be a point based on the position information of a predetermined point received by input receiving unit 60, to be described later.

Next, using the alignment result and the predetermined point, second shadow region detection unit 20 detects a second shadow region from the contrast enhanced two-dimensional image constituting the three-dimensional image obtained at the second time point (e.g., equilibrium phase) corresponding to the contrast enhanced two-dimensional image constituting the contrast enhanced three-dimensional image obtained at the first time point (e.g., late phase) (step ST5).

Here, a method for detecting the second shadow region will be described in detail.

Figure 3:
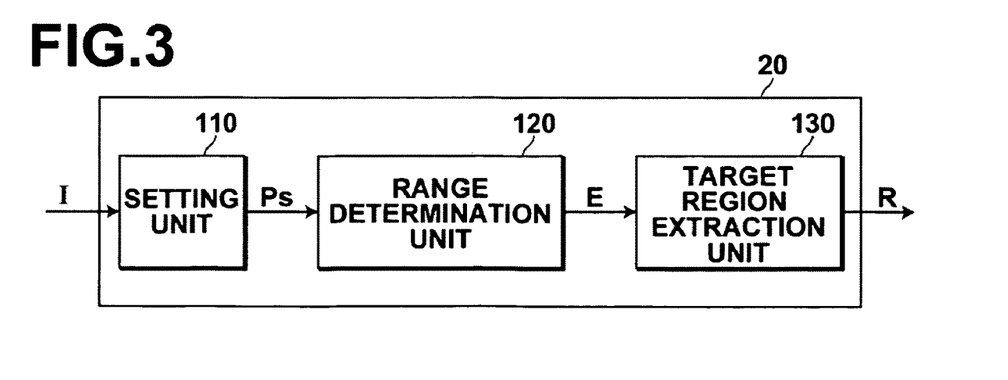
FIG. 3 is a block diagram of a second shadow region detection unit of the present invention, illustrating a configuration thereof.

Second shadow region detection unit 20 detects shadow region "R" from contrast enhanced two-dimensional image "I" set by the alignment result of alignment unit 30. As illustrated in FIG. 3, second shadow region detection unit 20 includes a setting unit 110 for setting arbitrary point "Ps" in shadow region "R", range determination unit 120 for determining existence range "E", in which shadow region "R" may possibly exist, in contrast enhanced two-dimensional image "I" using arbitrary point "Ps" and possible size "L" of shadow region "R", and target region extraction unit 130 for extracting shadow region "R" from contrast enhanced two-dimensional image "I" based on arbitrary point "Ps" and a point outside of existence range "E".

Setting unit 110 may be a unit for obtaining position information of a predetermined position set in the manner as described above and automatically setting the position as arbitrary point "Ps" or it may be a unit for setting a position determined by an operator in contrast enhanced two-dimensional image "I" displayed on a display device or the like using input receiving unit 60 (e.g., a mouse or a keyboard) equipped to the image processing apparatus as arbitrary point "Ps".

Here, arbitrary point "Ps" is constituted by one or more points set in shadow region "R", each of which may be a point set at a rough center of shadow region "R" or at a position away from the center.

Second shadow region detection unit 20 is a unit that determines, in contrast enhanced two-dimensional image "I", existence range "E" in which shadow region "R" may possibly exist, i.e., the range that may possibly include the entirety of shadow region "R" using arbitrary point "Ps" and possible size "L" of shadow region "R".

When determining existing range "E" such that a rough center of the range corresponds to arbitrary point "Ps" as described above, a range greater than possible size "L" of shadow region R, for example, a range 1.5 times as great as possible size "L" of shadow region R is set as existence range "E" so as to include the entirety of shadow region "R" even if arbitrary point "Ps" is set at a position away from the center of shadow region "R".

Here, possible size "L" of shadow region R is a physically possible maximum size of shadow regions. A maximum size (number of pixels) in contrast enhanced two-dimensional image "I" obtained by dividing a physically possible maximum size of lesions represented by shadow region R by a size represented by one pixel in contrast enhanced two-dimensional image "I" may be used as possible size "L" of shadow region "R". Alternatively, a maximum size of shadow region of those included in a multiple medical images may be used as possible size "L" of shadow region "R". Otherwise, it may be a size arbitrarily determined by any other method.

Figure 4:
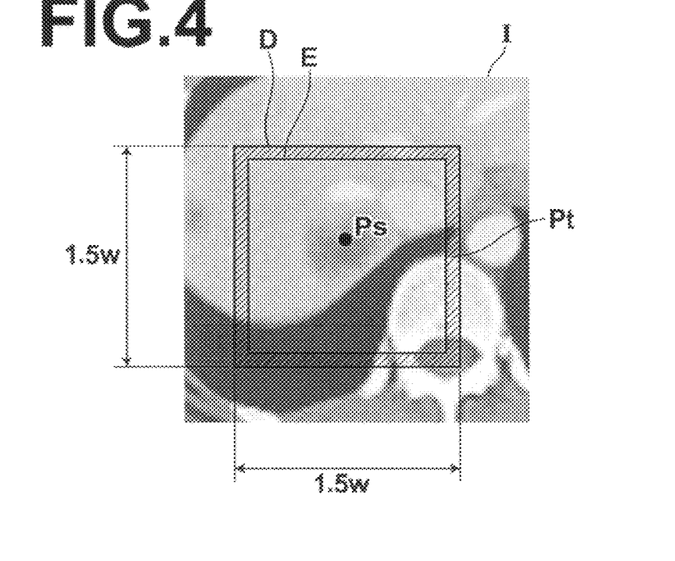
FIG. 4 illustrates an example of second shadow region to be detected by the second shadow region detection unit.

For example, as shown in FIG. 4, in contrast enhanced two-dimensional image "I" that includes shadow region "R" representing a liver tumor, if a physically possible maximum width of the liver tumor represented by shadow region "R" is, for example, 30 mm, and a size represented by one pixel in contrast enhanced two-dimensional image "I" is 0.5 mm in vertical direction and 0.5 mm in horizontal direction, the maximum width in contrast enhanced two-dimensional image "I", that is, 60 pixels (30 mm/0.5 mm=60) is determined as possible width "W" of shadow region "R". Then, square existence range "E" of 90×90 pixels obtained by multiplying the width "W" by 1.5 may be set with its center at arbitral point "Ps" set in the shadow region.

The peripheral shape of existence range "E" may take any of various shapes, such as a square, a circle, an ellipsoid, and the like.

Target region extraction unit 130 is a unit for extracting shadow region "R" from contrast enhanced two-dimensional image "I" based on arbitrary point "Ps" and point "Pt" outside of existence range "E". For example, target region extraction unit 130 extracts shadow region "R" by setting a determination area "D" that includes existence range "E" in contrast enhanced two-dimensional image "I" and, based on the fact that arbitrary point "Ps" is a pixel representing shadow region "R" and one or more points "Pt" set outside of existence range "E" are pixels representing background region, segmenting determination area "D" into shadow regions and background regions according to the graph cut region segmentation method described in a literature "Interactive Graph Cuts for Optimal Boundary & Region Segmentation of Objects in N-D images" by Yuri Y. Boykov and Marie-Pierre Jolly, Proceedings of "Internation Conference on Computer Vision", Vol. I, pp. 105-112, 2001.

Figure 5:
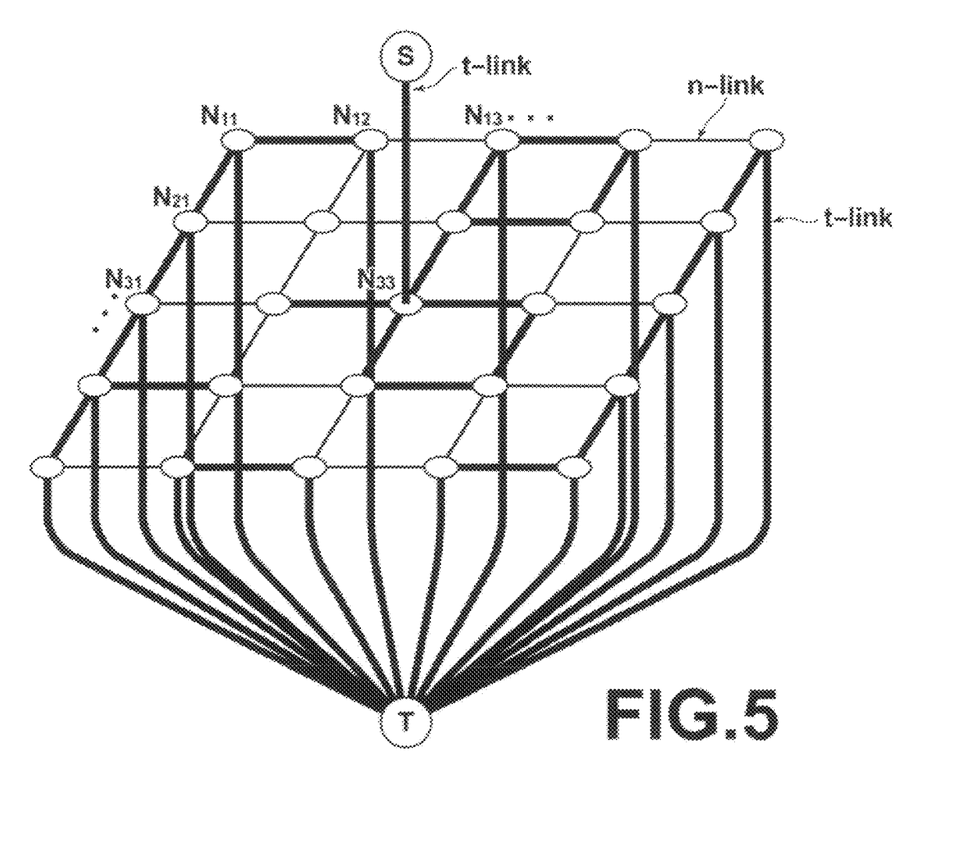
FIG. 5 illustrates a method of detecting a second shadow region by the second shadow region detection unit.

First, the segmentation method generates a graph which includes node Nij representing each pixel in determination area "D", nodes "S" and "T" representing labels that each pixel may possibly take (shadow region "R" and background region in this embodiment), an n-link connecting nodes of adjacent pixels, and a t-link connecting node Nij representing each pixel to node "S" representing shadow region or node "T" representing background region of a lesion, as shown in FIG. 5. Here, the n-link represents the probability that the adjacent pixels are in the same region by the thickness thereof. The probability is calculated based on the distance between the adjacent pixels and difference in pixel value between them.

The t-link connecting node Nij representing each pixel and node "S" representing shadow region "R" indicates the probability that each pixel is included in shadow region "R", and the t-link connecting node Nij representing each pixel and node "T" representing background region indicates the probability that each pixel is included in background region. If information as to whether each pixel belongs to shadow region "R" or background region is already given, these probabilities can be set according to the information. If such information is not given, the probabilities can be calculated based on statistical characteristics of pixel values of one or more pixels which have been known as being pixels in shadow region "R" or in background region.

Since arbitrary point "Ps" is a pixel set in shadow region "R", the t-link connecting node N33, representing point "Ps", and node "S", representing shadow region "R", is drawn thickly, as shown in FIG. 5. Further, since points "Pt" set outside of existence range "E" are pixels representing background regions, the t-link connecting each of nodes N11, N12, - - -, N15, N21, N25, N31 representing each of points "Pt" and node "T" representing background region is drawn thickly.

Figure 6:
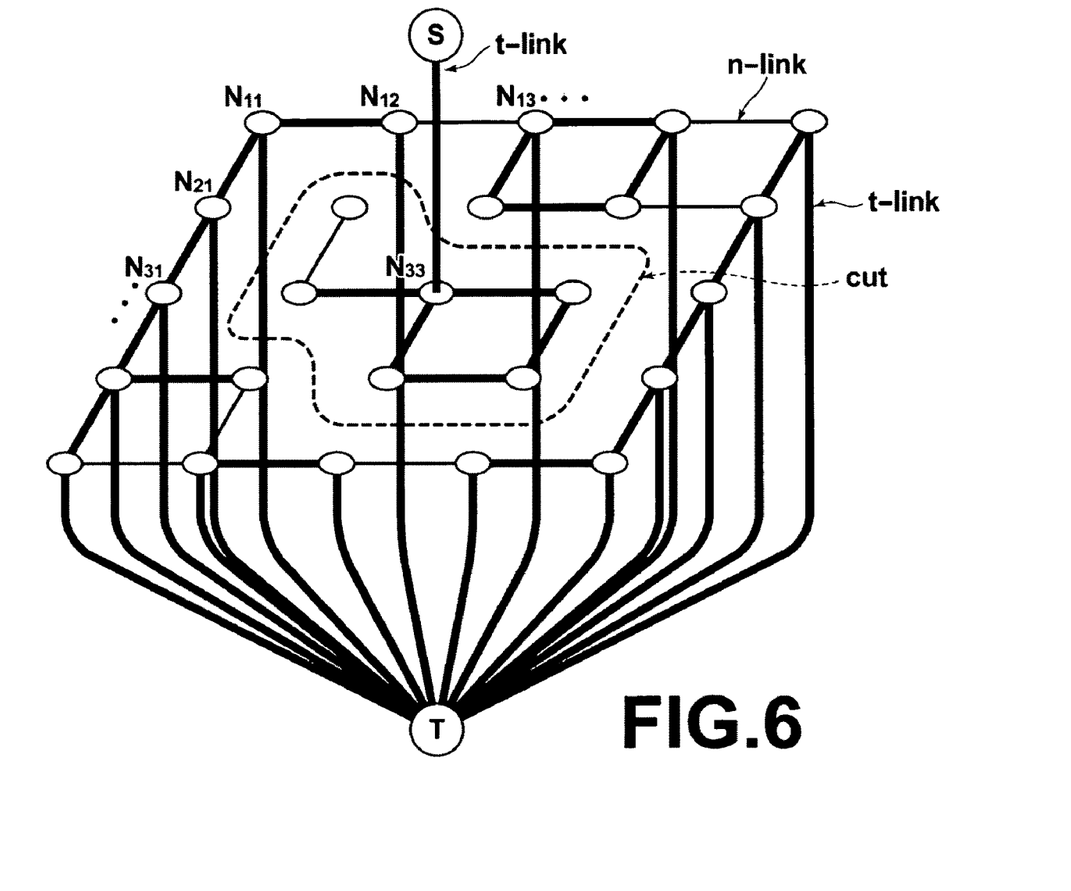
FIG. 6 illustrates another method of detecting a second shadow region by the second shadow region detection unit.
Figure 7:
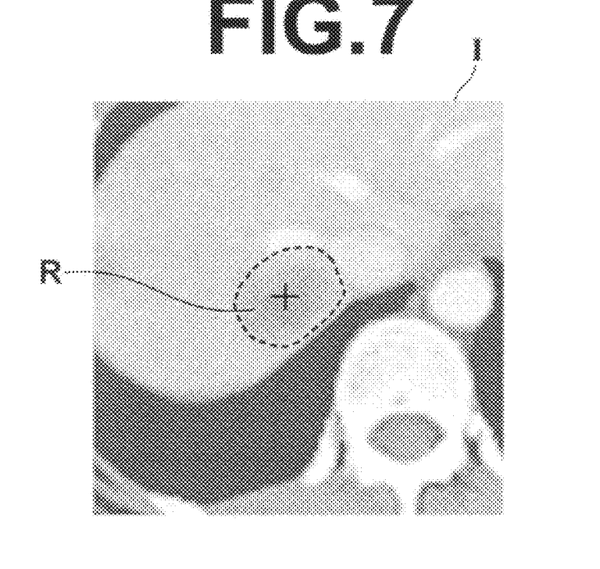
FIG. 7 illustrates an example of second shadow region detected by the second shadow region detection unit.

As shadow region "R" and background region are mutually exclusive regions, determination area "D" is segmented into shadow regions and background regions by, for example, cutting certain appropriate links of all of the t-links and n-links and separating node "S" from node "T" as indicated by the dashed line in FIG. 6. Here, optimal region segmentation can be achieved by cutting the t-links and n-links such that the sum of probability values of all of the links to be cut becomes minimum. One example of shadow region "R" extracted in the manner as described above is shown in FIG. 7. In FIG. 7, the contour of shadow region "R" is indicated by a dashed line.

Figure 8:
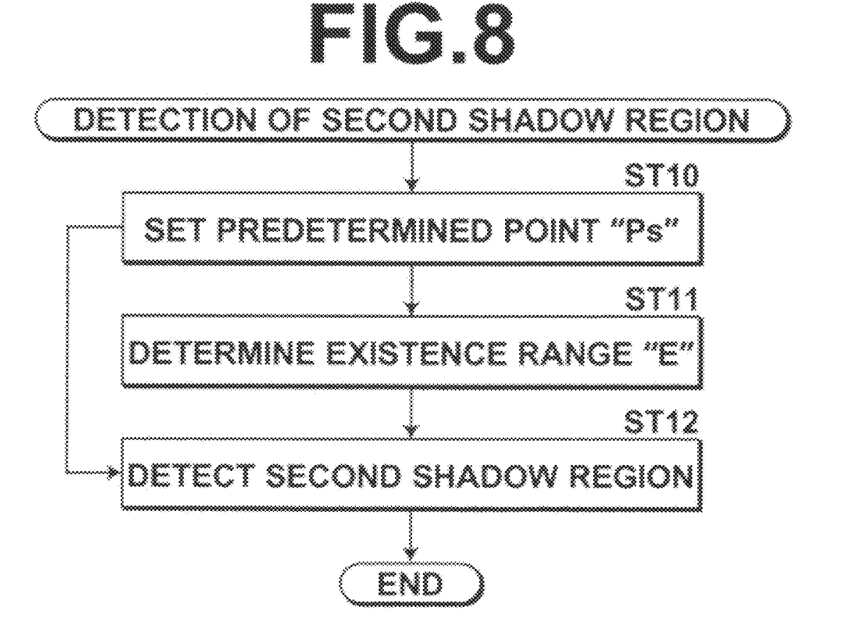
FIG. 8 is a flowchart of an embodiment of a method performed by the second shadow region detection unit.

A second shadow region extraction method of the present invention will now be described with reference to the flowchart shown in FIG. 8. First, setting unit 110 sets arbitrary point "Ps" in the shadow region in contrast enhanced two-dimensional image "I" obtained at a second time point (step ST10). Thereafter, range determination unit 120 determines existence range "E", in which the entirety of shadow region "R" may possibly be included, in contrast enhanced two-dimensional image "I" obtained at the second time point based on arbitrary point "Ps" set in step ST10 and possible size "L" of shadow region "R" (step ST11). Then, the target region extraction means 130 extracts a shadow region from contrast enhanced two-dimensional image "I" based on arbitrary point "Ps" set in step ST10 and point "Pt" outside of existence range "E" determined in step ST11 (step ST12).

According to the embodiment described above, when extracting a second shadow region from a contrast enhanced two-dimensional image, an arbitrary point is set in a shadow region, and an existence range, in which the shadow region may possibly be included, is determined in the image using the arbitrary point set in the shadow region and a possible size of the shadow region. Then, the shadow region is extracted from the image based on the arbitrary point set in the shadow region and a point outside of the determined existence range. This may automate manual specification of pixels representing background regions by using a point outside of the determined existence range and may reduce the burden of complicated manual input operation, whereby the user-friendliness may be improved in comparison with a conventional shadow region extraction method that requires manual specification of specific pixels representing shadow regions and other pixels representing background regions in the image.

In the aforementioned embodiment, the description has been made of a case in which the image processing apparatus of the present invention is applied to extract a shadow region from a contrast enhanced two-dimensional image. But the apparatus may also be applied to extract a shadow region from a contrast enhanced three-dimensional image. For example, the setting unit 110 may set an arbitrary point "Ps" as three-dimensional coordinates in a shadow region of a contrast enhanced three-dimensional image. Then, range determination unit 120 may determine a three-dimensional existence area "E", in which the entirety of the shadow region may possibly be included, in the image using arbitrary point "Ps" and possible size "L" of the shadow region. Then, the target region extraction unit 130 may extract a three-dimensional shadow region from the image based on arbitrary point "Ps" and point "Pt" outside of existence range "E" by the region segmentation method or the like. In this case, the peripheral shape of existence range "E" may take any of various shapes, such as a hexahedron, a sphere, and the like.

In the image processing apparatus of the present invention, the possible size of shadow region refers to a physically possible maximum size of those of shadow regions of the same type. Where two or more types of shadow regions are to be extracted from an image by the image processing apparatus of the present invention, each existence range, in which each type of shadow region may possibly exist, may be determined appropriately with reference to a list provided by obtaining the possible size for each type of shadow region.

The shadow region described above may be an organ region representing an organ, such as liver, spleen, or kidney, or otherwise a region representing a lesion, such as brain tumor, chest nodule, liver tumor, liver cyst, or kidney cyst.

Figure 2:
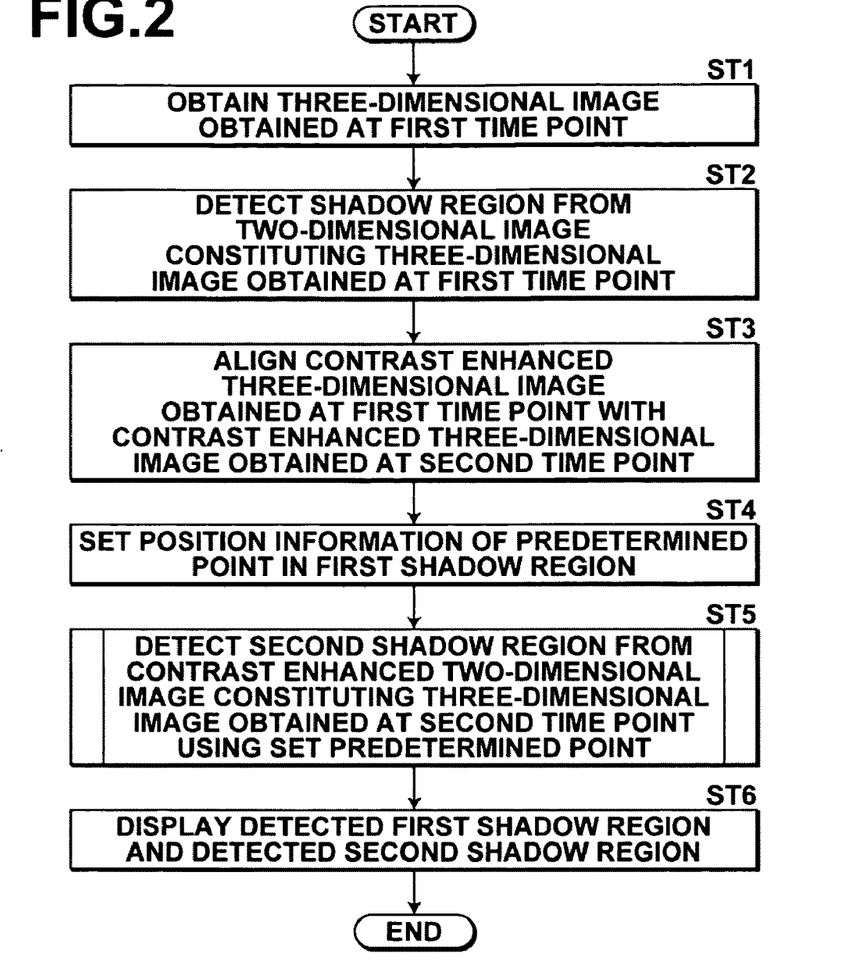
FIG. 2 is a flowchart of an embodiment of an image processing method of the present invention.

Now, referring back to the flowchart of FIG. 2, display unit 50 displays the first shadow region detected by first shadow region detection unit 10 and the second shadow region detected by second shadow region detection unit 20 (step ST6).

Figure 9:
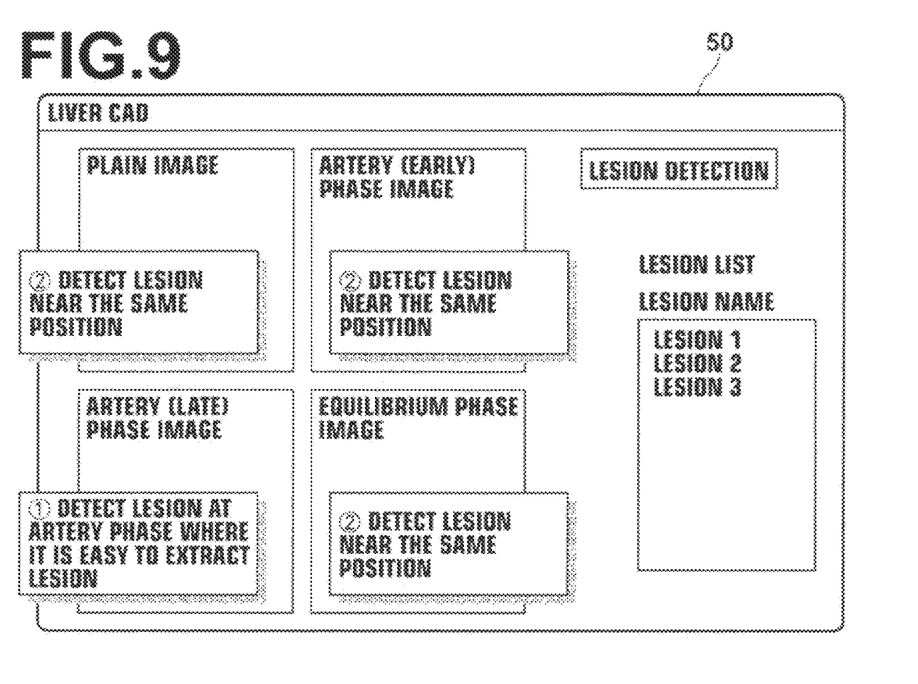
FIG. 9 illustrates a display example displayed on a display unit of the present invention.

More specifically, display unit 50 displays a predetermined two-dimensional image constituting a three-dimensional image taken prior to the injection of a contrast agent on the screen, as shown in FIG. 9.

For example, a contrast enhanced two-dimensional image obtained at a first time point (late phase), a contrast enhanced two-dimensional image obtained at a second time point (equilibrium phase), and a contrast enhanced two-dimensional image obtained at a third time point (early phase) may be displayed at the same time.

When a second shadow region is not detected from each of contrast enhanced two-dimensional images obtained at the second and third time points, the image processing apparatus may control display unit 50 to display contrast enhanced two-dimensional images obtained at the second and third time points corresponding to the contrast enhanced two-dimensional image obtained at the first time point (corresponding to alignment result of alignment unit 30).

It is possible for a user to select a lesion list displayed on display unit 50 by giving an instruction through input receiving unit 60 and to change the display of contrast enhanced two-dimensional images corresponding to the lesion list.

Figure 10A:
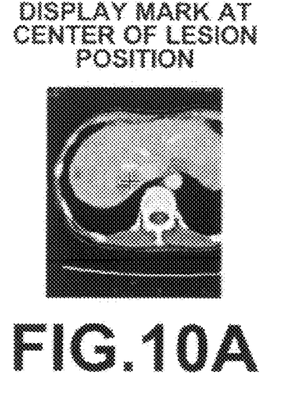
FIGS. 10A to 10C illustrate display examples of contrast enhanced two-dimensional images displayed on the display unit of the present invention.

Further, display unit 50 may be configured to display a shadow region with, for example, a mark at the center of the lesion using information obtained when calculating the center or contour of the shadow region, as shown in FIG. 10A.

Figure 10B:
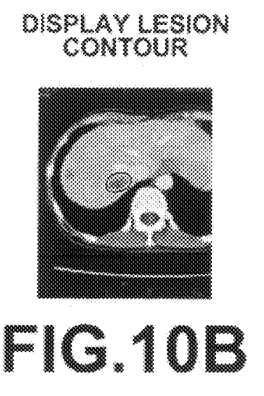

Still further, display unit 50 may be configured to display a shadow region with, for example, the contour of the lesion using information obtained when calculating the center or contour of the shadow region, as shown in FIG. 10B.

Figure 10C:
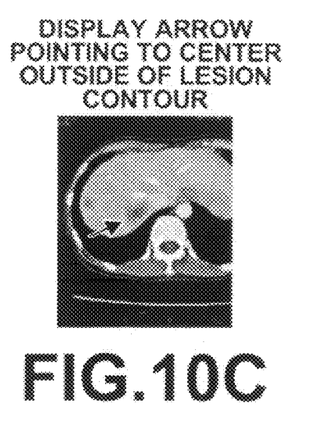

Further, display unit 50 may be configured to display a shadow region with, for example, an arrow pointing to the center of the lesion outside of the contour thereof using information obtained when calculating the center or contour of the shadow region, as shown in FIG. 10C.

So far the description has been made of a case in which images taken by a CT system are used, but images taken by a PET system or a MRI system may also be used.

What is claimed is:

1. An image processing apparatus, comprising:
a first shadow region detection unit for detecting a first shadow region from a contrast enhanced two-dimensional image constituting a contrast enhanced three-dimensional image obtained at a first time point among a plurality of contrast enhanced three-dimensional images of a subject obtained at different time points;
a second shadow region detection unit for detecting, by the use of position information of a point in the first shadow region detected by the first shadow region detection unit, a second shadow region corresponding to the first shadow region from a contrast enhanced two-dimensional image constituting a contrast enhanced three-dimensional image obtained at a second time point different from the first time point;
a display unit for displaying the first shadow region detected by the first shadow region detection unit and the second shadow region detected by the second shadow region detection unit;
a database storing data that indicate a contrast enhanced three-dimensional image obtained at a point in time when a contrast enhancement effect is maximally reflected according to tumor type;
an input receiving unit for receiving input of a tumor type; and
an image determination unit for determining the contrast enhanced three-dimensional image obtained at a point in time when a contrast enhancement effect is maximally reflected based on the data stored in the database and the tumor type received by the input receiving unit.

2. The image processing apparatus of claim 1, wherein the second shadow region detection unit includes:
a setting unit for setting, based on the position information of the point in the first shadow region, a corresponding point corresponding to the point in the contrast enhanced two-dimensional image constituting the contrast enhanced three-dimensional image obtained at the second time point;
a range determination unit for determining an existence range, in which the second shadow region may possibly exist, in the contrast enhanced two-dimensional image constituting the contrast enhanced three-dimensional image obtained at the second time point using the corresponding point and a possible size of the second shadow region; and
a shadow region extraction unit for extracting the second shadow region by a graph cut region segmentation method from the contrast enhanced two-dimensional image constituting the contrast enhanced three-dimensional image obtained at the second time point based on the corresponding point set by the setting unit and a point outside of the existence range determined by the range determination unit.

3. The image processing apparatus of claim 1, wherein:
the apparatus further includes:
a specific area detection unit for detecting a specific area, which includes the first shadow region, from the contrast enhanced two-dimensional image constituting the contrast enhanced three-dimensional image obtained at the first time point;
a corresponding area detection unit for detecting a corresponding area, having substantially the same shape as that of the specific area detected by the specific area detection unit, from the contrast enhanced two-dimensional image constituting the contrast enhanced three-dimensional image obtained at the second time point, and
the second shadow region detection unit is a unit for detecting the second shadow region from the contrast enhanced two-dimensional image, which includes the corresponding area detected by the corresponding point detection unit, constituting the contrast enhanced three-dimensional image obtained at the second time point.

4. The image processing apparatus of claim 1, wherein the first shadow region is a tumor region in a liver area.

5. The image processing apparatus of claim 1, wherein the second shadow region is a tumor region in a liver area.

6. An image processing method, comprising the steps of:
detecting a first shadow region from a contrast enhanced two-dimensional image constituting a contrast enhanced three-dimensional image obtained at a first time point among a plurality of contrast enhanced three-dimensional images of a subject obtained at different time points;
detecting, by the use of position information of a point in the first shadow region, a second shadow region corresponding to the first shadow region from a contrast enhanced two-dimensional image constituting a contrast enhanced three-dimensional image obtained at a second time point different from the first time point; and
displaying the first shadow region and the second shadow region;
storing data that indicate a contrast enhanced three-dimensional image obtained at a point in time when a contrast enhancement effect is maximally reflected according to tumor type;
receiving input of a tumor type; and
determining the contrast enhanced three-dimensional image obtained at a point in time when a contrast enhancement effect is maximally reflected based on the data stored and the tumor type received.

7. A non-transitory computer readable recording medium on which is recorded a program for causing a computer to perform:
a first shadow region detection function for detecting a first shadow region from a contrast enhanced two-dimensional image constituting a contrast enhanced three-dimensional image obtained at a first time point among a plurality of contrast enhanced three-dimensional images of a subject obtained at different time points;
a second shadow region detection function for detecting, by the use of position information of a point in the first shadow region detected by the first shadow region detection function, a second shadow region corresponding to the first shadow region from a contrast enhanced two-dimensional image constituting a contrast enhanced three-dimensional image obtained at a second time point different from the first time point;
a display function for displaying the first shadow region detected by the first shadow region detection function and the second shadow region detected by the second shadow region detection function;
a database function for storing data that indicates a contrast enhanced three-dimensional image obtained at a point in time when a contrast enhancement effect is maximally reflected according to tumor type;
an input receiving function for receiving input of a tumor type; and an image determination function for determining the contrast enhanced three-dimensional image obtained at a point in time when a contrast enhancement effect is maximally reflected based on the database function for storing data and the tumor type received by the input receiving function.

8. An image processing apparatus, comprising:
an input receiving unit for receiving input of a point in a first shadow region of a contrast enhanced two-dimensional image constituting a contrast enhanced three-dimensional image obtained at a first time point among a plurality of contrast enhanced three-dimensional images of a subject obtained at different time points;
a second shadow region detection unit for detecting, by the use of position information of the point in the first shadow region received by the input receiving unit, a second shadow region corresponding to the first shadow region from a contrast enhanced two-dimensional image constituting a three-dimensional image obtained at a second time point different from the first time point;
a display unit for displaying the first shadow region and the second shadow region detected by the second shadow region detection unit;
a database storing data that indicate a contrast enhanced three-dimensional image obtained at a point in time when a contrast enhancement effect is maximally reflected according to tumor type;
an input receiving unit for receiving input of a tumor type; and an image determination unit for determining the contrast enhanced three-dimensional image obtained at a point in time when a contrast enhancement effect is maximally reflected based on the data stored in the database and the tumor type received by the input receiving unit.

9. An image processing method, comprising the steps of:
receiving input of a point in a first shadow region of a contrast enhanced two-dimensional image constituting a contrast enhanced three-dimensional image obtained at a first time point among a plurality of contrast enhanced three-dimensional images of a subject obtained at different time points;
detecting, by the use of position information of the point in the first shadow region, a second shadow region corresponding to the first shadow region from a contrast enhanced two-dimensional image constituting a three-dimensional image obtained at a second time point different from the first time point;
displaying the first shadow region and the second shadow region;
storing data that indicate a contrast enhanced three-dimensional image obtained at a point in time when a contrast enhancement effect is maximally reflected according to tumor type;
receiving input of a tumor type; and
determining the contrast enhanced three-dimensional image obtained at a point in time when a contrast enhancement effect is maximally reflected based on the data stored and the tumor type received.

10. A non-transitory computer readable recording medium on which is recorded a program for causing a computer to perform:
an input receiving function for receiving input of a point in a first shadow region of a contrast enhanced two-dimensional image constituting a contrast enhanced three-dimensional image obtained at a first time point among a plurality of contrast enhanced three-dimensional images of a subject obtained at different time points;
a second shadow region detection function for detecting, by the use of position information of the point in the first shadow region received by the input receiving function, a second shadow region corresponding to the first shadow region from a contrast enhanced two-dimensional image constituting a three-dimensional image obtained at a second time point different from the first time point;
a display function for displaying the first shadow region and the second shadow region detected by the second shadow region detection function;
a database function for storing data that indicate a contrast enhanced three-dimensional image obtained at a point in time when a contrast enhancement effect is maximally reflected according to tumor type;
an input receiving function for receiving input of a tumor type; and
an image determination function for determining the contrast enhanced three-dimensional image obtained at a point in time when a contrast enhancement effect is maximally reflected based on the database function for storing data and the tumor type received by the image determination function.

* * * * *